United States Patent
Ogasawara et al.

(10) Patent No.: US 11,530,912 B2
(45) Date of Patent: Dec. 20, 2022

(54) DISTANCE MEASUREMENT DEVICE AND DISTANCE MEASUREMENT METHOD

(71) Applicant: Hitachi-LG Data Storage, Inc., Tokyo (JP)

(72) Inventors: Hiroshi Ogasawara, Tokyo (JP); Toshimichi Shintani, Tokyo (JP); Takahiro Komaki, Hitachi (JP); Hisataka Sugiyama, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 148 days.

(21) Appl. No.: 17/106,326

(22) Filed: Nov. 30, 2020

(65) Prior Publication Data

US 2021/0285757 A1 Sep. 16, 2021

(30) Foreign Application Priority Data

Mar. 12, 2020 (JP) .............................. JP2020-043097

(51) Int. Cl.
*G01B 11/14* (2006.01)
*G01S 17/08* (2006.01)
(Continued)

(52) U.S. Cl.
CPC ............ *G01B 11/14* (2013.01); *G01S 7/4972* (2013.01); *G01S 17/08* (2013.01); *G06T 7/70* (2017.01); *G01S 17/894* (2020.01); *G06T 7/521* (2017.01)

(58) Field of Classification Search
CPC ...... G01S 17/894; G01S 17/10; G01S 7/4816; G01S 7/4863; G01S 17/42; G01S 7/4972;
(Continued)

(56) References Cited

U.S. PATENT DOCUMENTS 10,614,584 B2 * 4/2020 Izumi ...................... G06T 7/521
10,705,218 B2 * 7/2020 Masuda .................. G01S 17/42
(Continued)

FOREIGN PATENT DOCUMENTS

CN 104662435 A * 5/2015 .......... G01S 5/0247
DE 102019118477 A1 * 1/2021
(Continued)

*Primary Examiner* — Gordon J Stock, Jr.
(74) *Attorney, Agent, or Firm* — Mattingly & Malur, PC

(57) ABSTRACT

A distance measurement device includes a light-emitting-unit that emits irradiation light toward an object; a light-receiving unit that receives reflected light from the object; a distance-calculation unit that calculates a distance to the object based on a transmission time of the reflected light received; a posture-adjustment mechanism that adjusts a posture of at least the light-receiving-unit; and a posture-controller that drives the posture-adjustment mechanism. The light-receiving unit is formed of a two-dimensional sensor in which a plurality of pixels are two-dimensionally arrayed, and the distance-calculation unit calculates two-dimensional distance data from received light data in each of the pixels of the two-dimensional sensor. The posture-controller controls the posture of the light-receiving unit via the posture-adjustment mechanism such that a direction of a pixel array of the two-dimensional sensor is inclined by a predetermined angle θ with respect to a direction of a ridge of the object to receive the light.

2 Claims, 8 Drawing Sheets

(51) Int. Cl.
    *G01S 7/497*     (2006.01)
    *G06T 7/70*      (2017.01)
    *G01S 17/894*    (2020.01)
    *G06T 7/521*     (2017.01)

(58) Field of Classification Search
    CPC ........ G01S 17/08; G01S 7/484; G01S 7/4865;
              G01S 7/4868; G01S 7/493; G01B 11/14;
              G01B 11/026; G06T 7/70; G06T 7/521
    See application file for complete search history.

(56) References Cited

U.S. PATENT DOCUMENTS

| | | | |
|---|---|---|---|
| 10,838,063 B2 * | 11/2020 | Matsuura | G01S 7/484 |
| 2006/0213280 A1 * | 9/2006 | Shimada | G01B 11/026 |
| | | | 73/800 |
| 2021/0270971 A1 * | 9/2021 | Inaba | G01S 7/4808 |

FOREIGN PATENT DOCUMENTS

| | | | | |
|---|---|---|---|---|
| GB | 2292605 A | * | 2/1996 | ............ G01B 11/08 |
| JP | 2006292731 A | * | 10/2006 | ........... G01B 11/026 |
| JP | 2018-054381 A | | 4/2018 | |
| TW | I282406 B | * | 6/2007 | |

* cited by examiner

F I G. 1
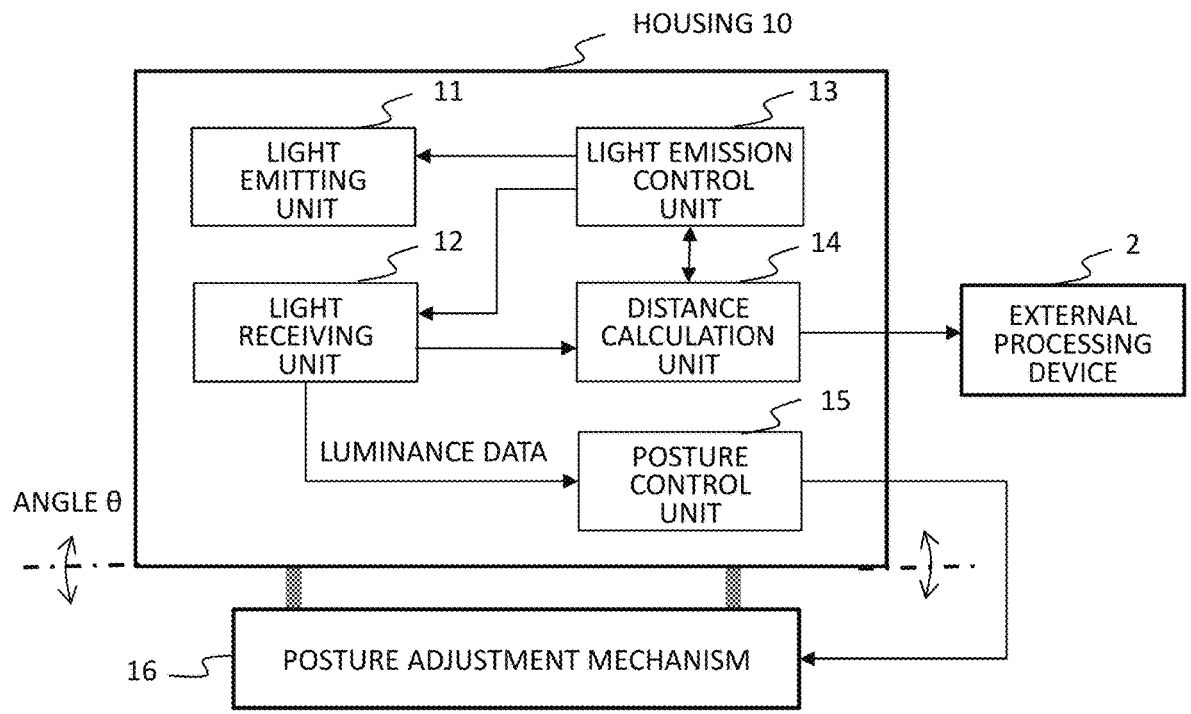
F I G. 2
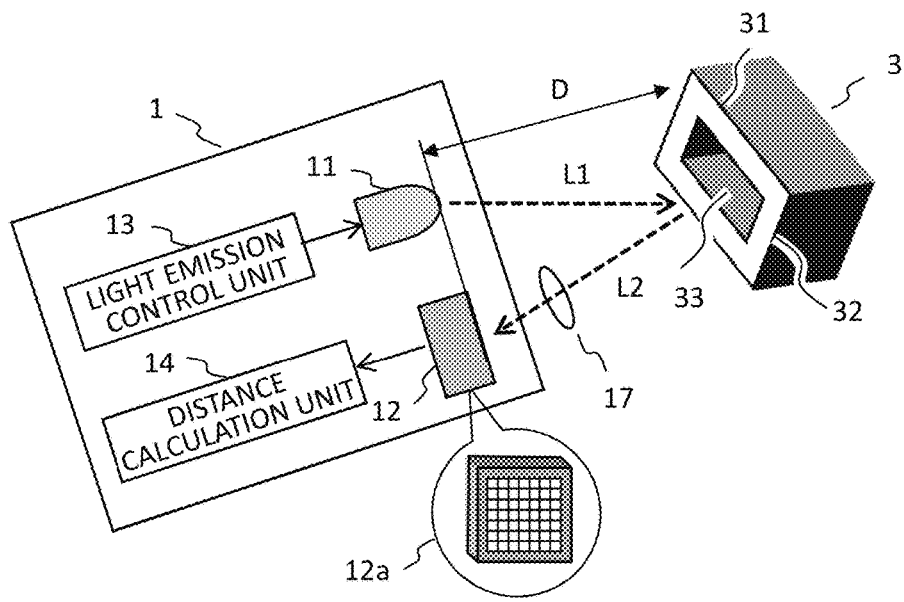

<COMPARATIVE EXAMPLE>
PARALLEL DISPOSITION

11: LIGHT EMITTING UNIT
12: LIGHT RECEIVING UNIT

VERTICAL RESOLUTION y
$y = V$

HORIZONTAL RESOLUTION x
$x = H$

<PRESENT EMBODIMENT>
OBLIQUELY INTERSECTING DISPOSITION
VERTICAL RESOLUTION

11: LIGHT EMITTING UNIT
12: LIGHT RECEIVING UNIT

VERTICAL RESOLUTION y
$y = H\sin\theta$

<PRESENT EMBODIMENT>
OBLIQUELY INTERSECTING DISPOSITION
HORIZONTAL RESOLUTION

11: LIGHT EMITTING UNIT
12: LIGHT RECEIVING UNIT

HORIZONTAL RESOLUTION x
$X = V\sin\theta$

11: LIGHT EMITTING UNIT
12: LIGHT RECEIVING UNIT
16': POSTURE ADJUSTMENT MECHANISM

DISTANCE MEASUREMENT DEVICE AND DISTANCE MEASUREMENT METHOD

CLAIM OF PRIORITY

The present application claims priority from Japanese patent application serial No. JP 2020-43097, filed on Mar. 12, 2020, the content of which is hereby incorporated by reference into this application.

BACKGROUND OF THE INVENTION

(1) Field of the Invention

The present invention relates to a distance measurement device and a distance measurement method that measure a distance to an object based on a transmission time of light.

(2) Description of the Related Art

There is known a distance measurement device (hereinafter, also referred to as a TOF device) using a method for measuring a distance to an object based on the transmission time of light (hereinafter, time-of-flight method: TOF method). The principle of the TOF device is to measure a delay time until irradiation light emitted from a light emitting unit is reflected by the object to return to a light receiving unit, to calculate the distance to the object. A two-dimensional image sensor such as a CCD is used in the light receiving unit, so that distance data can be displayed as a two-dimensional distance image and the three-dimensional position or shape of the object can be figured out.

When the object is small or when the shape of the object is wanted to be measured with high accuracy, it is required to improve resolutions in a two-dimensional plane. Namely, the problem here is not the resolution of the distance to the object but measurement intervals in vertical and horizontal directions in a measurement region. In this regard, for example, JP 2018-54381 A (hereinafter, referred to as Patent Document 1) describes an optical distance measurement device that projects radiant light toward an object to be measured according to a projection timing determined by Lissajous scanning, to measure a distance based on reflected light from the object to be measured. It is described that in that case, in a target area for Lissajous scanning, the laser radiation timing is changed to shift the irradiation pattern to a different irradiation pattern and irradiation is performed, which is substantially equivalent to reducing an interval between measurement positions, and thus the resolution can be improved.

SUMMARY OF THE INVENTION

When the light receiving unit of the distance measurement device is formed of a two-dimensional sensor, the accuracy of measurement (resolution) in a two-dimensional plane is determined by the number of pixels of the two-dimensional sensor, the distance to the object, and the angle of field.

For example, the object may be a three-dimensional object mainly formed of flat surfaces, and the position of a ridge (edge) thereof may be wanted to be measured. In that case, when a pixel array of the two-dimensional sensor is disposed parallel to the ridge, the accuracy of measuring the position of the ridge is determined by a pixel interval in a direction orthogonal to the ridge, and may not be able to satisfy a desired accuracy.

In the technique described in Patent Document 1, the laser radiation timing is changed to switch the irradiation pattern to a different irradiation pattern; however, an improvement in resolution by one irradiation pattern can be expected only in one direction in the two-dimensional plane. For example, even if the resolution in the vertical direction is improved by an irradiation pattern, the resolution in the horizontal direction orthogonal to the vertical direction cannot be improved. If an irradiation pattern that improves the resolutions in both directions at the same time is assumed based on the concept of Patent Document 1, it is expected that the measurement time is increased to cause a decrease in frame rate.

An object of the present invention is to provide a distance measurement device and a distance measurement method that can improve resolutions in both directions orthogonal to each other in a two-dimensional plane without increasing the measurement time.

According to an aspect of the present invention, there is provided a distance measurement device that measures a distance to an object based on a transmission time of light, the device including: a light emitting unit that emits irradiation light toward the object; a light receiving unit that receives reflected light from the object; a distance calculation unit that calculates the distance to the object based on a transmission time of the reflected light received by the light receiving unit; a posture adjustment mechanism that adjusts a posture of at least the light receiving unit; and a posture control unit that drives the posture adjustment mechanism. The light receiving unit is formed of a two-dimensional sensor in which a plurality of pixels are two-dimensionally arrayed. The distance calculation unit calculates two-dimensional distance data from received light data in each of the pixels of the two-dimensional sensor. The posture control unit controls the posture of the light receiving unit via the posture adjustment mechanism such that a direction of a pixel array of the two-dimensional sensor is inclined by a predetermined angle θ with respect to a direction of a ridge of the object to receive the light.

In addition, according to another aspect of the present invention, there is provided a distance measurement method for measuring a distance to an object based on a transmission time of light, the method including: receiving light reflected by the object with a two-dimensional sensor, in which a plurality of pixels are two-dimensionally arrayed, to obtain two-dimensional distance data from received light data in each of the pixels; and inclining a direction of a pixel array of the two-dimensional sensor by a predetermined angle θ with respect to a direction of a ridge of the object to receive the light.

According to the present invention, resolutions in both directions orthogonal to each other in a two-dimensional plane are improved at the same time without an increase in measurement time. As a result, particularly when the object is a three-dimensional object mainly formed of flat surfaces, the position of the ridge thereof can be measured with high accuracy.

BRIEF DESCRIPTION OF THE DRAWINGS

These and other features, objects and advantages of the present invention will become more apparent from the following description when taken in conjunction with the accompanying drawings wherein:

FIG. 1 is a block diagram illustrating a first configuration example of a distance measurement device;

FIG. 2 is a view describing the principle of distance measurement by the TOF method;

DETAILED DESCRIPTION OF THE EMBODIMENT

Figure 3A:
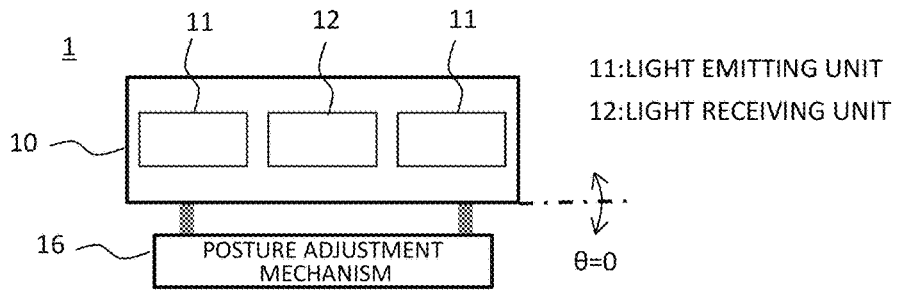
FIGS. 3A to 3D are views describing resolutions when a light receiving unit is not inclined.

Hereinafter, embodiments of a distance measurement device of the present invention will be described. However, the present invention should not be interpreted to be limited to the contents of the embodiments to be illustrated below. The persons skilled in the art can easily understand that a specific configuration of the present invention may be changed without departing from the concept or purpose of the present invention.

In the configurations of the invention to be described below, the same reference signs are used in common between different drawings for the same parts or parts having the similar functions, and duplicated descriptions will be omitted.

The distance measurement device of the present invention has, as will be described below, the function of adjusting the posture of a light receiving unit, and improves resolutions in vertical and horizontal directions with the function.

First Embodiment

FIG. 1 is a block diagram illustrating a first configuration example of a distance measurement device according to the present invention. A distance measurement device (TOF device) 1 includes, as a distance measurement function, a light emitting unit 11 that irradiates an object with pulsed light from a light source, a light receiving unit 12 that receives the pulsed light, which is reflected from the object, with a two-dimensional sensor, a light emission control unit 13 that controls turning on and off of the light emitting unit 11 and the amount of emission of light, and a distance calculation unit 14 that calculates a distance to the object from a detection signal (received light data) of the light receiving unit 12, and these components are accommodated in a housing 10.

In addition, the distance measurement device 1 includes, as a posture adjustment function of the light receiving unit 12, a posture control unit 15 inside the housing 10 and a posture adjustment mechanism 16 outside the housing 10. The posture adjustment mechanism 16 holds the entirety of the housing 10, and adjusts the posture (inclination angle θ with respect to an installation surface) of the housing 10. The posture control unit 15 drives the posture adjustment mechanism 16 based on a detection signal (luminance data) of the light receiving unit 12 to control the posture of the housing 10, namely, the inclination angle θ of the light receiving unit 12.

Regarding the posture adjustment which will be described in detail later, during distance measurement, the housing 10 is inclined to cause the directions of a pixel array of the two-dimensional sensor of the light receiving unit 12 to obliquely intersect the directions of ridges of the object to be measured at a predetermined angle; and thereby, the resolutions in the vertical and horizontal directions can be improved at the same time.

In the distance measurement device 1, distance data calculated by the distance calculation unit 14 is sent to an external processing device 2. The external processing device 2 is formed of, for example, a personal computer, and creates a distance image showing the shape of the object or position data indicating the position of a ridge of the object based on the distance data to display the distance image or the position data on a display or the like.

FIG. 2 is a view describing the principle of distance measurement by the TOF method. The distance measurement device 1 includes the light emitting unit 11 and the light receiving unit 12 to cause the light emitting unit 11 such as a laser diode (LD) or a light emitting diode (LED) to emit irradiation light L1 for distance measurement toward an object 3. Here, as an example of the object 3, a palette for a forklift is provided. The palette is a three-dimensional object mainly formed of flat surfaces, and has a horizontal ridge 31, a vertical ridge 32, and an opening 33, into which a fork is inserted, in a front surface. For example, in a forklift operation, it is required that the distance measurement device 1 accurately detects the positions of the ridges 31 and 32 or the opening 33 and the fork is correctly inserted into the opening 33.

The light receiving unit 12 receives reflected light L2, which is reflected by the object 3, via an objective lens 17 with a two-dimensional sensor 12a. The two-dimensional sensor 12a is a CCD sensor, a CMOS sensor, or the like in which a plurality of pixels are two-dimensionally arrayed, and can obtain two-dimensional distance data from received light data in each of the pixels. In addition, a luminance image of the object 3 can be obtained from luminance data in each of the pixels of the two-dimensional sensor 12a.

The object 3 is present apart by a distance D from the light emitting unit 11 and the light receiving unit 12. Here, when the speed of light is c and the transmission time from when the light emitting unit 11 emits the irradiation light L1 to when the light receiving unit 12 receives the reflected light L2 is t, the distance D to the object 3 is obtained by D=c×t/2. Incidentally, in practical distance measurement performed by the distance calculation unit 14, instead of the transmission time t, an irradiation pulse with a predetermined width is emitted and received while the timing of an exposure gate of the two-dimensional sensor 12a is shifted, and the distance D is calculated from the value of the amount of light received (accumulated amount) at different timings.

Hereinafter, regarding the resolutions during measurement by the distance measurement device 1 of the present embodiment, as an example of the object 3, the palette of FIG. 2 will be described. The object 3 (palette) is horizontally installed on a floor, and the distance measurement device 1 is also installed parallel to the floor. As a result, as it is, the directions of the ridges of the object 3 are substantially parallel to the directions of the pixel array of the light receiving unit 12 (two-dimensional sensor 12a). In the present embodiment, the posture of the housing 10 is adjusted by the posture adjustment mechanism 16 to cause the directions of the pixel array of the light receiving unit 12 (two-dimensional sensor 12a) to be inclined with respect to the directions of the ridges of the object 3; and thereby, the resolutions in the vertical and horizontal directions in a two-dimensional plane are improved.

FIGS. 3A to 3D are views describing resolutions when the housing (light receiving unit) is not inclined for comparison. FIG. 3A is a block diagram of the distance measurement device 1 as viewed from the front, and the housing 10 is parallel to the floor (inclination angle θ=0). Two right and left light emitting units 11 and the light receiving unit 12 interposed therebetween are present inside the housing 10. Here, the two light emitting units 11 are provided; however, one light emitting unit 11 may be provided only on one side. The light receiving unit 12 includes the two-dimensional sensor 12a, and a horizontal direction of the pixel array of the two-dimensional sensor 12a is parallel to a bottom surface of the housing 10.

Figure 3B:
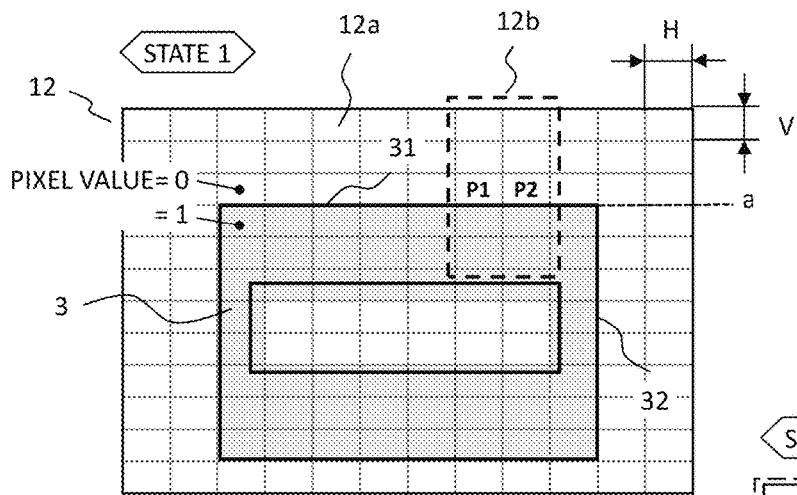
Figure 3D:
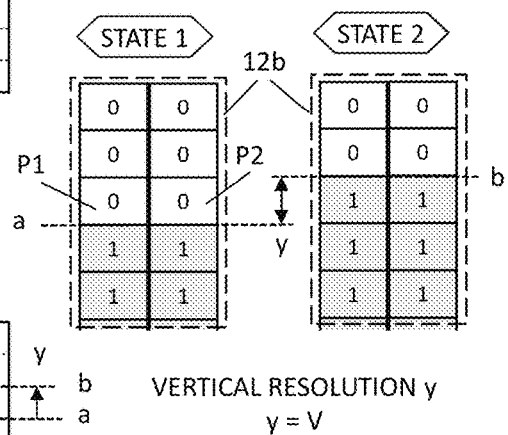
Figure 3C:
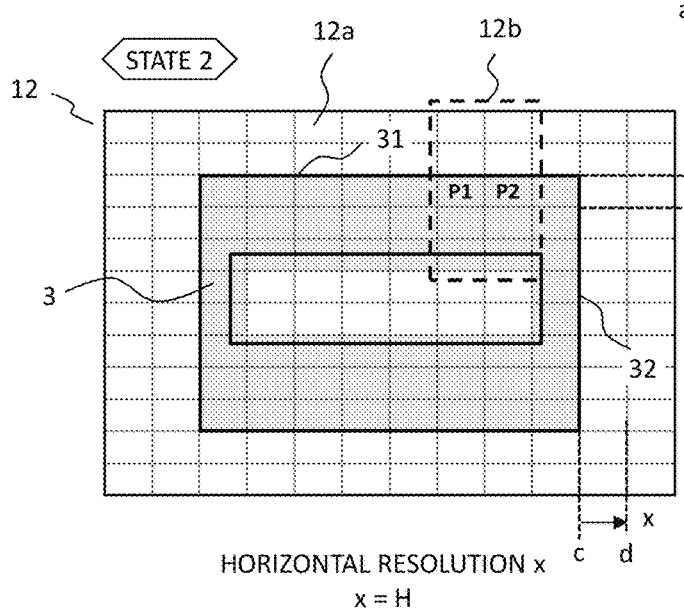

FIGS. 3B and 3C illustrate the pixel arrangement of the two-dimensional sensor 12a inside the light receiving unit 12 by grid, and illustrate the shape of the object 3 (palette) projected thereon in an overlapping manner. FIGS. 3B and 3C illustrate a case where the position of the object 3 is shifted by one pixel in the vertical direction, and the state transitions from <state 1> to <state 2>.

Incidentally, the actual size of the object 3 is much larger than the size of the two-dimensional sensor 12a, but is reduced by a lens magnification by the objective lens 17, which is provided on an incidence side of the light receiving unit 12, and the reduced size is projected on the two-dimensional sensor 12a. In the following description, when the size (movement amount) of the object 3 is compared to the pixel size of the two-dimensional sensor 12a, unless otherwise particularly specified, the value of either one is corrected by the lens magnification, and the corrected value is subjected to comparison.

The horizontal and vertical directions of the pixel array of the two-dimensional sensor 12a are disposed parallel to the horizontal and vertical directions of the ridges of the object 3. The number of the pixels is 12×12, and pixels that detect the object 3 are illustrated in gray (pixel value=1) and pixels that do not detect the object 3 are illustrated in white (pixel value=0). Here, according to a definition of the pixel value, when a part of the object 3 is present in one pixel area (grid), the one pixel area is in gray (pixel value=1). However, this definition is arbitrary, and for example, even if the pixel value is set to 1 when 50% of the object 3 is present therein, the following conclusion is the same.

In <state 1> of FIG. 3B, the position of the horizontal ridge 31 of the object 3 is a line a, and the object 3 is not detected, for example, in pixels P1 and P2.

In <state 2> of FIG. 3C, the object 3 is moved by one pixel (vertical pixel interval V) in the vertical direction. The position of the horizontal ridge 31 moves to a line b, and for example, the object is detected in the pixels P1 and P2.

FIG. 3D comparatively illustrates the states of the pixels in a sensor region 12b (indicated by a broken line frame) in <state 1> and <state 2> in an enlarged manner.

Here, regarding the resolution, when the object 3 is moved in the vertical direction, the maximum movement amount where the pixel value of any of the pixels in the two-dimensional sensor 12a relating to the detection of the horizontal ridge 31 of interest is not changed, namely, the width of a dead zone for the movement of the object is defined as a vertical resolution. In this example, when the horizontal ridge 31 exceeds the line a, all the pixel values of a horizontal pixel array including the pixels P1 and P2 are switched from 0 to 1 at once, and are maintained at 1 until the horizontal ridge 31 reaches the line b. When the horizontal ridge 31 exceeds the line b, the pixel values of a pixel array adjacent from above to the pixels P1 and P2 are switched. Namely, a section from the line a to the line b is the dead zone, and a vertical resolution y is expressed by y=V (vertical pixel interval).

A horizontal resolution is defined in the same manner. In this example, since the vertical ridge of the object 3 and the vertical direction of the pixel array are disposed parallel to each other, a horizontal resolution x is defined as x=H (horizontal pixel interval).

As described above, when the pixel array of the two-dimensional sensor 12a is disposed parallel to the ridges, the accuracy of measuring the positions of the ridges is determined by a pixel interval in a direction orthogonal to the ridges, and cannot satisfy a desired accuracy.

Figure 4A:
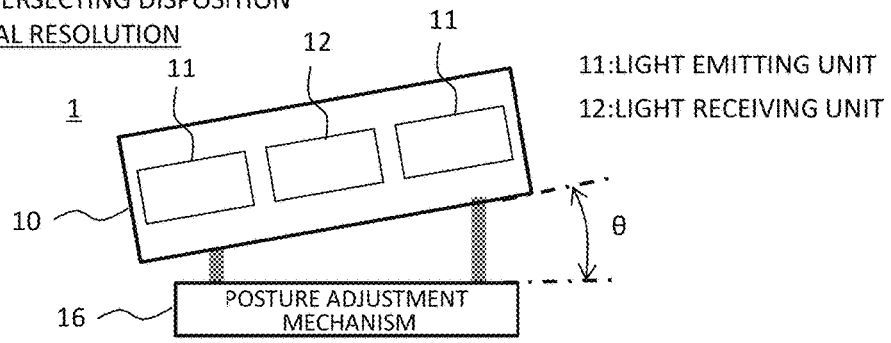
FIGS. 4A to 4D are views describing a vertical resolution when the light receiving unit is inclined.

FIGS. 4A to 4D are views describing the vertical resolution when the housing (light receiving unit) is inclined in the present embodiment. FIG. 4A is a block diagram of the distance measurement device 1 as viewed from the front, and the housing 10 is inclined by the angle θ with respect to the floor. In the drawing of this example, the inclination angle θ is approximately 10 deg., but as will described later, is set to an optimal angle according to a desired resolution.

Accordingly, the horizontal direction of the pixel array of the two-dimensional sensor 12a included in the light receiving unit 12 is also inclined by the angle θ with respect to the floor.

Figure 4B:
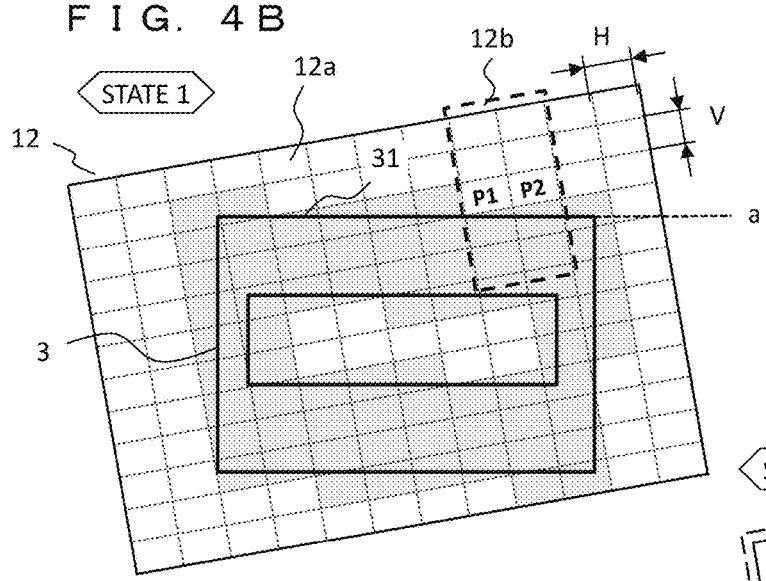
Figure 4C:
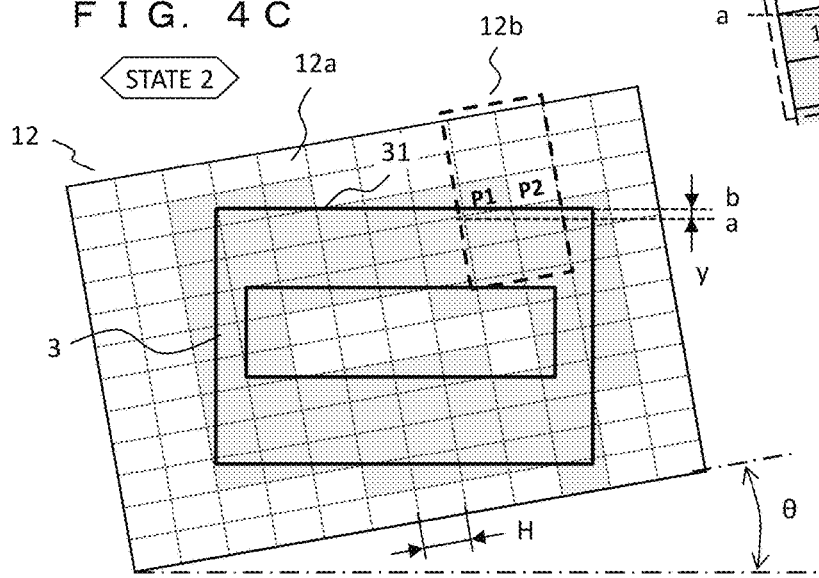

FIGS. 4B and 4C illustrate the pixel arrangement of the two-dimensional sensor 12a inside the light receiving unit 12 by grid, and illustrate the shape of the object 3 (palette) projected thereon in an overlapping manner. FIGS. 4B and 4C illustrate a case where the position of the object 3 is shifted by y in the vertical direction (upward direction), and the state transitions from <state 1> to <state 2>.

The horizontal direction of the pixel array of the two-dimensional sensor 12a and the horizontal ridge 31 of the object 3 are disposed to obliquely intersect each other at the angle θ. Similar to FIGS. 3A to 3D, pixels that detect the object 3 are illustrated in gray (pixel value=1) and pixels that do not detect the object 3 are illustrated in white (pixel value=0). At that time, as described above, when even a small part of the object 3 is present in one pixel area (grid), the pixel value is defined as 1 (gray).

In <state 1> of FIG. 4B, the position of the horizontal ridge 31 of the object 3 is the line a, and passes through the lower left corner of the pixel P1. In this state, the object 3 is not detected, for example, in the pixels P1 and P2.

In <state 2> of FIG. 4C, the object 3 is moved by y in the vertical direction (upward direction), so that the position of the horizontal ridge 31 moves to the line b to pass through the lower left corner of the pixel P2. A movement amount y is smaller than the vertical pixel interval V, and is expressed by y=H sin θ (H is the horizontal pixel interval).

Figure 4D:
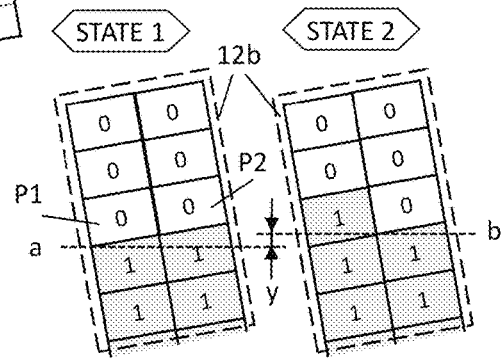

In this state, since a part of the object is detected, for example, in the pixel P1, the pixel value of the pixel P1 is 1. FIG. 4D comparatively illustrates the states of the pixels in the sensor region 12b (indicated by a broken line frame) in <state 1> and <state 2> in an enlarged manner.

The vertical resolution in this case is obtained according to the above-described definition. When the horizontal ridge 31 exceeds the line a, the pixel value of the pixel P1 is switched from 0 to 1, and the pixel value of the pixel P2 remains 0. When the horizontal ridge 31 exceeds the line b, the pixel value of the pixel P2 is switched from 0 to 1. As a result, a section from the line a to the line b is a dead zone, and the width y=H sin θ of the section is the vertical resolution. When the above vertical resolution of FIGS. 3A to 3D is compared to the vertical resolution y=V, the resolution is greatly improved.

Figure 5A:
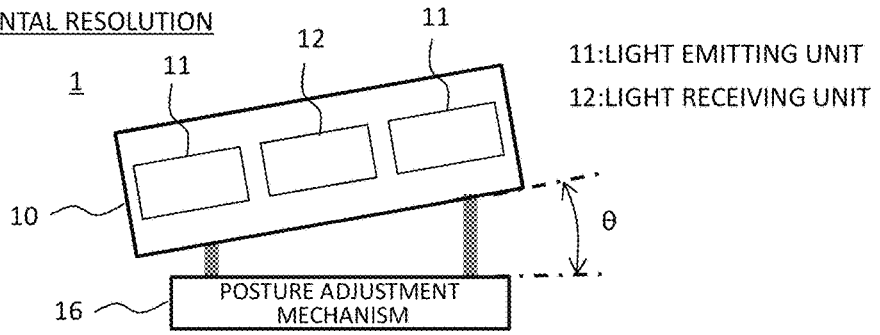
FIGS. 5A to 5D are views describing a horizontal resolution when the light receiving unit is inclined.

FIGS. 5A to 5D are views describing the horizontal resolution when the housing (light receiving unit) is inclined in the present embodiment. FIG. 5A is a block diagram of the distance measurement device 1 as viewed from the front, and similar to FIG. 4A, the housing 10 is inclined by the angle θ with respect to the floor. Accordingly, the vertical direction of the pixel array of the two-dimensional sensor 12a included in the light receiving unit 12 is also inclined by the angle θ with respect to the normal line of the floor.

Figure 5B:
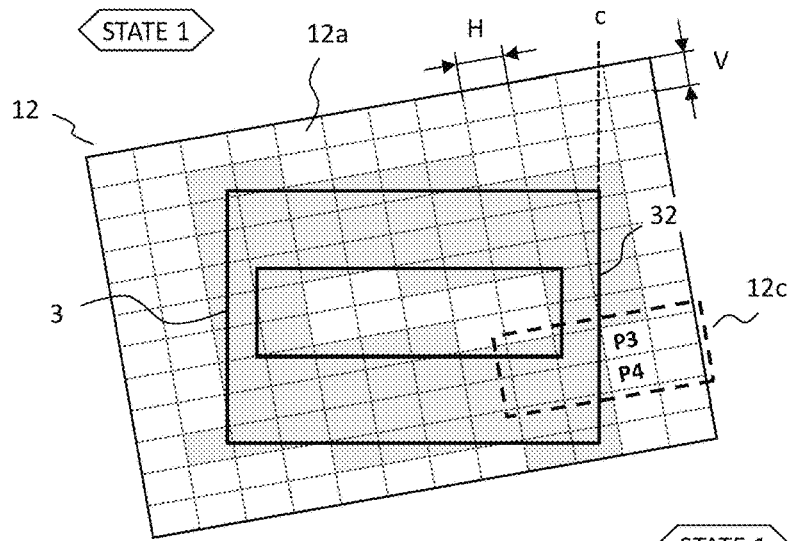
Figure 5D:
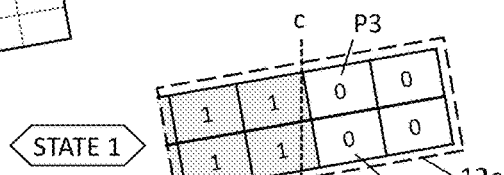
Figure 5C:
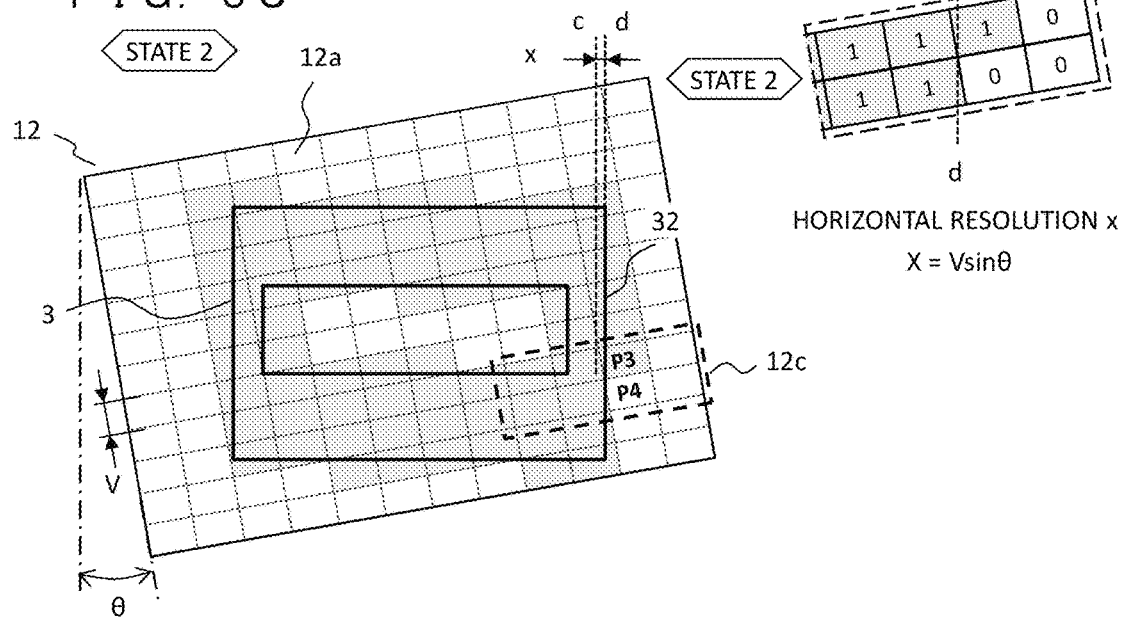

FIGS. 5B and 5C illustrate the pixel arrangement of the two-dimensional sensor 12a inside the light receiving unit 12 by grid, and illustrate the shape of the object 3 (palette) projected thereon in an overlapping manner. FIGS. 5B and 5C illustrate a case where the position of the object 3 is shifted by x in the horizontal direction (rightward direction), and the state transitions from <state 1> to <state 2>.

The vertical direction of the pixel array of the two-dimensional sensor 12a and the vertical ridge 32 of the object 3 are disposed to obliquely intersect each other at the angle θ. Similar to FIGS. 4A to 4D, pixels that detect the object 3 are illustrated in gray (pixel value=1) and pixels that do not detect the object 3 are illustrated in white (pixel value=0). At that time, as described above, when even a small part of the object 3 is present in one pixel area (grid), the pixel value is defined as 1 (gray).

In <state 1> of FIG. 5B, the position of the vertical ridge 32 of the object 3 is a line c, and passes through the upper left corner of a pixel P3. In this state, the object 3 is not detected, for example, in pixels P3 and P4.

In <state 2> of FIG. 5C, the object 3 is moved by x in the horizontal direction (rightward direction), so that the position of the vertical ridge 32 moves to a line d to pass through the upper left corner of the pixel P4. A movement amount x is smaller than the horizontal pixel interval H, and is expressed by x=V sin θ (V is the vertical pixel interval). In this state, since a part of the object is detected, for example, in the pixel P3, the pixel value of the pixel P3 is 1.

FIG. 5D comparatively illustrates the states of the pixels in a sensor region 12c (indicated by a broken line frame) in <state 1> and <state 2> in an enlarged manner.

The horizontal resolution in this case is obtained according to the above-described definition. When the vertical ridge 32 exceeds the line c, the pixel value of the pixel P3 is switched from 0 to 1, and the pixel value of the pixel P4 remains 0. When the vertical ridge 32 exceeds the line d, the pixel value of the pixel P4 is switched from 0 to 1. As a result, a section from the line c to the line d is a dead zone, and the width x=V sin θ of the section is the horizontal resolution. When the above horizontal resolution of FIGS. 3A to 3D is compared to the horizontal resolution x=H, the resolution is greatly improved.

As described above, the housing 10 (light receiving unit 12) is inclined to cause the directions of the pixel array of the two-dimensional sensor 12a to obliquely intersect the ridges of the object 3; and thereby, the resolutions in both of the vertical direction and the horizontal direction can be improved at the same time. Next, the optimal range of the inclination angle θ will be described.

Figure 6A:
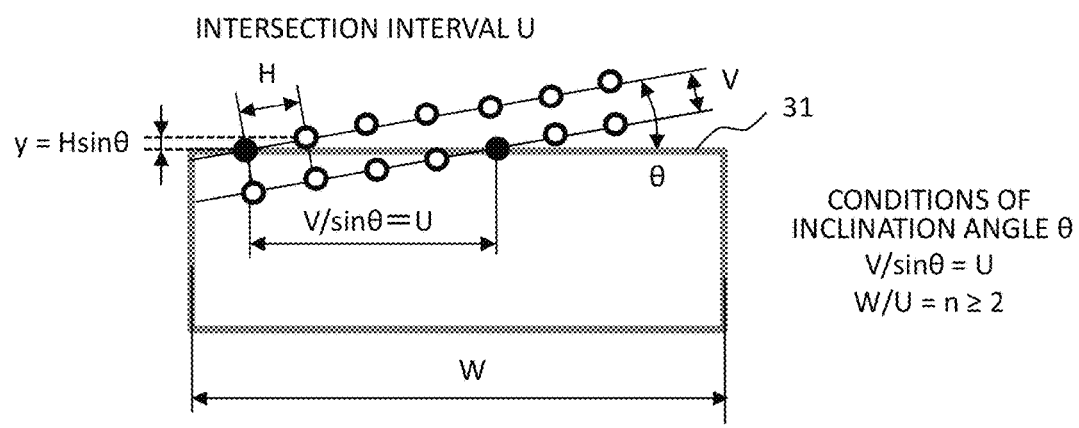
FIGS. 6A and 6B are views describing the optimal range of an inclination angle θ.
Figure 6B:
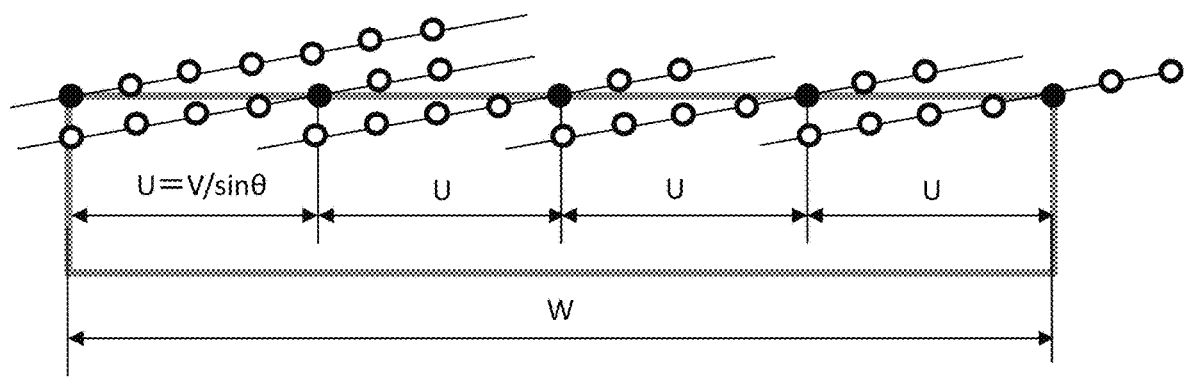

FIGS. 6A and 6B are views describing the optimal range of an inclination angle θ. FIG. 6A illustrates a state where the horizontal ridge 31 and horizontal pixel arrays intersect each other at the angle θ, and FIG. 6B illustrates a state where the horizontal ridge 31 is long and the number of intersections is increased. Pixels are indicated by circular marks (○ and ●), and particularly, pixels on the ridge 31 are indicated by ● mark.

In FIG. 6A, the vertical resolution y is expressed, as described above, by y=H sin θ, and the smaller the angle θ is, the more the resolution is improved. In other words, the larger the angle θ is, the more the effect of an improvement in resolution is decreased, and when the angle θ is 45 deg., the vertical resolution y is H√2. Incidentally, when the angle θ exceeds 45 deg., the resolution is determined by the state of intersection of the horizontal ridge 31 with not the horizontal pixel arrays but vertical pixel arrays orthogonal to the horizontal pixel arrays, namely, an inclination angle (90 deg.−θ).

Meanwhile, the number of lines of the horizontal pixel arrays intersecting the horizontal ridge 31 will be considered. An interval (intersection interval) U between the horizontal pixel arrays on the horizontal ridge 31 is expressed by U=V/sin θ. When the length of the horizontal ridge 31 is W, the number n of lines (number of intersection lines) of the horizontal pixel arrays intersecting the horizontal ridge 31 is expressed by n=W/U=(W/V)sin θ. In the example of FIG. 6A, the number n of intersection lines is 2 and the pixels with ● marks intersect the horizontal ridge 31.

The shorter the length W of the ridge is or the smaller the inclination angle θ is, the more the number n of intersection lines is decreased. If the number n of intersection lines is less than 1, a section where the ridge cannot be detected at the resolution y by the horizontal pixel arrays is generated, which is unsuitable. In addition, in order to perform detection while identifying the direction of the ridge, since the ridge is required to be detected at two or more points, it is desirable that the number n of intersection lines satisfies n 2. Namely, it is desirable that the inclination angle θ is set such that n=(W/V)sin θ 2 is satisfied.

The same applies also to the horizontal resolution. When the length of the vertical ridge 32 is W', it is desirable that the inclination angle θ is set such that n=(W'/V)sin θ 2 is satisfied.

In the example illustrated in FIG. 6B, the number n of intersection lines is 4. In this drawing, since both ends of the ridge are detected, the number of detection points is 5. Even if data of both ends is unstable, since 50% or more of the length W of the ridge is covered by three central points, reliable data can be acquired.

Figure 7:
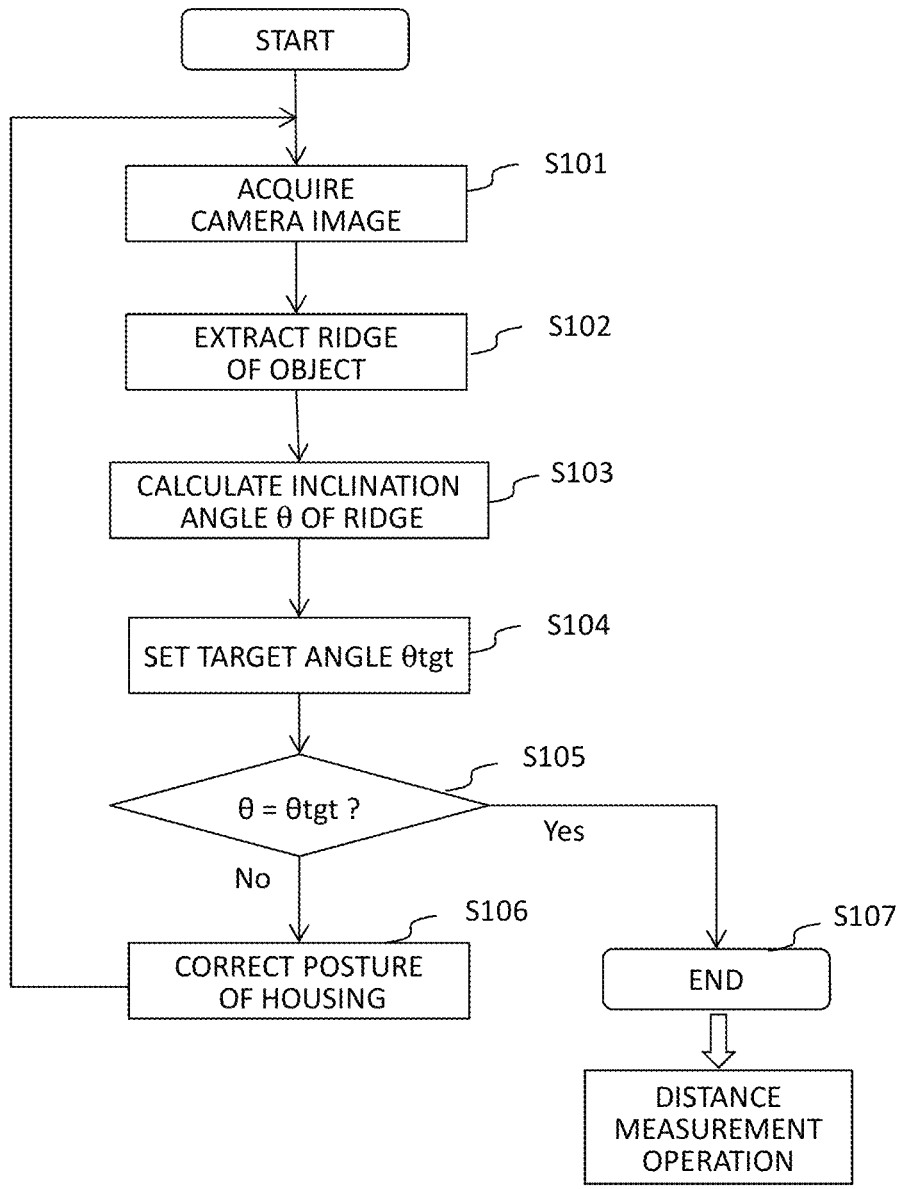
FIG. 7 is a flowchart illustrating a procedure for adjusting the posture of a housing (light receiving unit)

FIG. 7 is a flowchart illustrating a procedure for adjusting the posture of the housing (light receiving unit). In the adjustment of the posture of the housing, the posture control unit 15 drives the posture adjustment mechanism 16 to adjust the posture of the housing 10, so that the directions of the pixel array of the two-dimensional sensor 12a in the light receiving unit 12 is inclined by a predetermined angle θtgt with respect to the directions of the ridges of the object 3. However, since the ridge of the object 3 is generally aligned in an arbitrary direction, first, the direction of the ridge is detected, and the direction of the pixel array is adjusted to obliquely intersect the direction of the ridge.

In the present embodiment, in order to detect the direction of the ridge, luminance data of the two-dimensional sensor 12a of the light receiving unit 12 is used. In that case, since the angle of the direction of the ridge of the object 3 may be adjusted with reference to the direction of the pixel array of the two-dimensional sensor 12a, the process can be efficiently performed. Hereinafter, steps will be described in order.

S101: The posture control unit 15 acquires a camera image of the object 3 from the luminance data of the light receiving unit 12.

S102: A ridge portion (for example, horizontal ridge) to be measured is extracted from the camera image of the object. At that time, the direction of the ridge can be accurately extracted from a difference in luminance level between the pixels in the two-dimensional sensor 12a. Incidentally, when the object has a plurality of the ridges, an operator may select a desired ridge while seeing a monitor image.

S103: The inclination angle θ of the extracted direction of the ridge is calculated with reference to the direction of the pixel array of the two-dimensional sensor 12a.

S104: As illustrated in FIGS. 6A and 6B, the target angle θtgt for the inclination angle is set such that $(W/V)\sin\theta \geq 2$ is satisfied. Regarding the length W of the ridge, the length of the ridge extracted in S102 may be measured.

S105: It is determined whether or not the inclination angle θ calculated in S103 is equal to the target angle θtgt.

S106: When the inclination angle θ is not equal to the target angle θtgt, the posture adjustment mechanism 16 is driven to correct the posture of the housing 10 by a difference between the angles. Thereafter, the process returns to S101, and the above steps are repeated.

S107: When the inclination angle θ is equal to the target angle θtgt, the adjustment process is ended and the process proceeds to a distance measurement operation.

In the above flowchart, when a ridge portion (for example, an opening of the palette) to be measured in the object is determined, the extraction of the ridge in S102 is automatically performed. As a result, even if the object is postured toward an arbitrary direction, the direction of the light receiving unit 12 (two-dimensional sensor 12a) can be automatically adjusted to an optimum state according to the arbitrary direction.

Figure 8A:
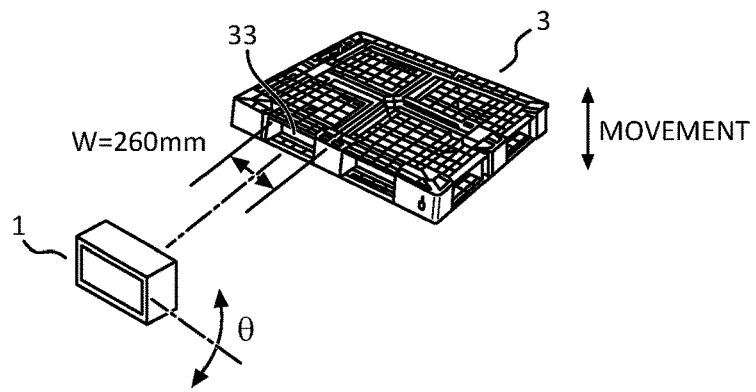
FIGS. 8A to 8C are views describing one example of the effect of an improvement in resolution according to the present embodiment.
Figure 8B:
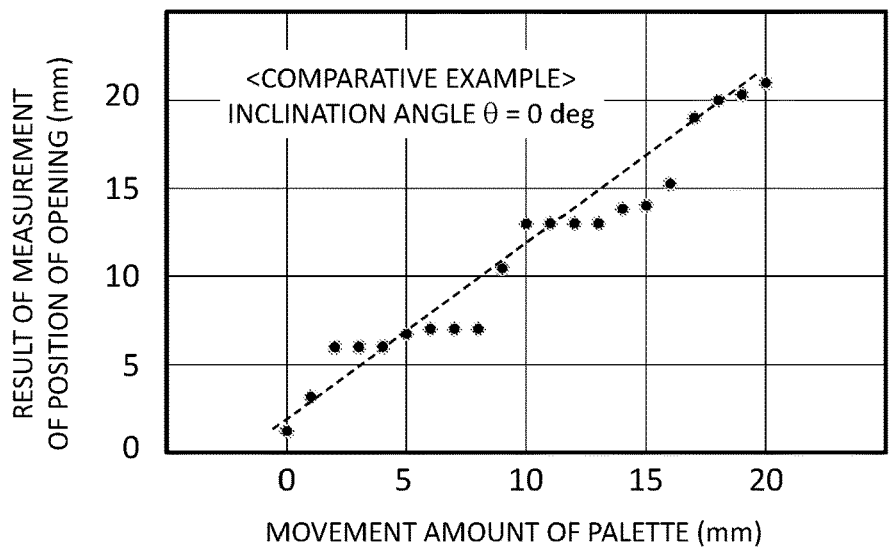
Figure 8C:
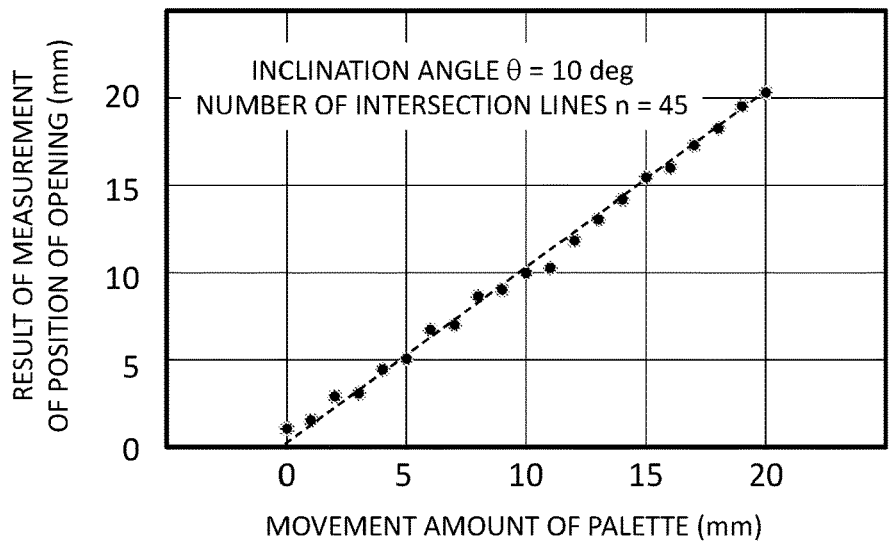

FIGS. 8A to 8C are views describing one example of the effect of an improvement in resolution according to the present embodiment. FIG. 8A is a descriptive view of a confirmation experiment method, and FIGS. 8B and 8C illustrate the results of measurement when the inclination angle θ is 0 as a comparative example and when the inclination angle θ is 10 deg., respectively.

As illustrated in FIG. 8A, the position (height) of the opening 33 of the palette is measured with the distance measurement device 1 while the object (palette) 3 is moved in the vertical direction. The length W of a horizontal ridge of the opening 33 to be measured of the palette is 260 mm.

FIG. 8B illustrates a case where the housing of the distance measurement device 1 is horizontally installed (inclination angle θ=0), and the palette is moved by 20 mm at an interval of 1 mm. The movement amount of the palette and the results of measurement of the opening of the palette are plotted on the horizontal axis and the vertical axis, respectively. According to the obtained result, the movement of the palette could not be tracked at a movement interval of 1 mm, there was present a dead zone of approximately 7 mm corresponding to the pixel interval in the vertical direction, and the vertical resolution was approximately 7 mm.

FIG. 8C illustrates a case where the housing of the distance measurement device 1 is installed to be inclined. In this case, the inclination angle θ is 10 deg. and the number n of intersection lines is $(W/V)\sin\theta = 4.5$. According to the obtained result, it was confirmed that the movement of the palette was substantially tracked at a movement interval of 1 mm and the vertical resolution was improved to approximately 1 mm.

As described above, according to the present embodiment, the resolutions in both directions orthogonal to each other in a two-dimensional plane are improved at the same time without an increase in density of the light receiving units 12 (two-dimensional sensors 12a) themselves. As a result, particularly when the object is a three-dimensional object mainly formed of flat surfaces, the position of the ridge thereof can be measured with high accuracy.

Second Embodiment

Figure 9A:
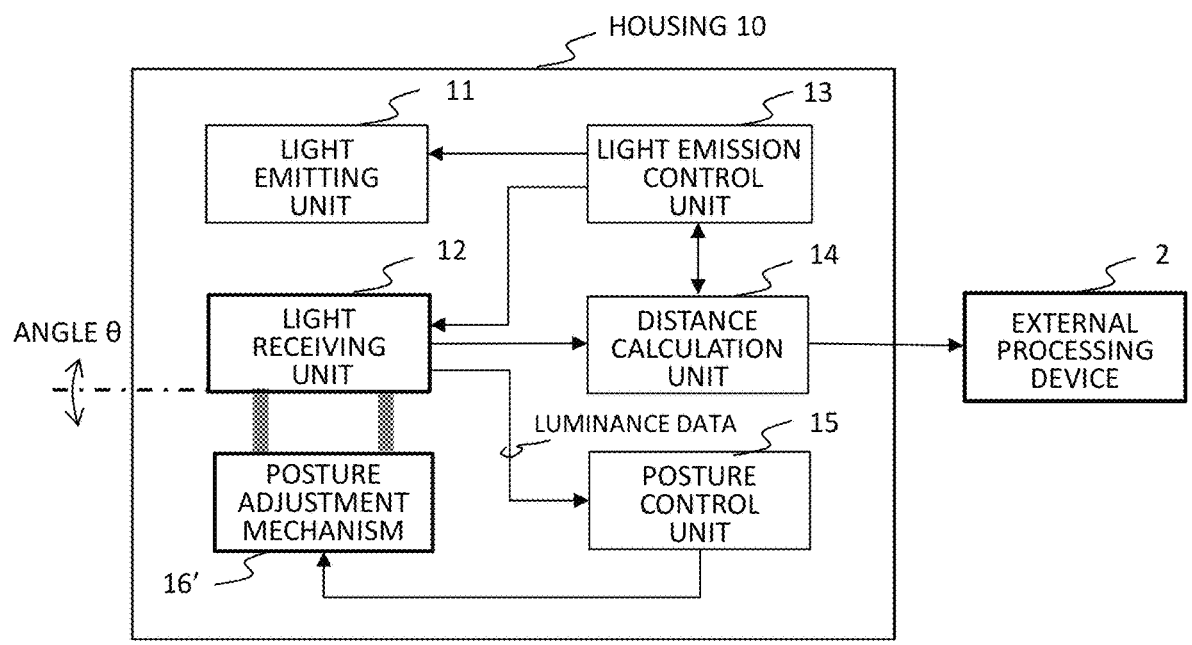
FIGS. 9A and 9B are block diagrams illustrating a second configuration example of the distance measurement device.
Figure 9B:
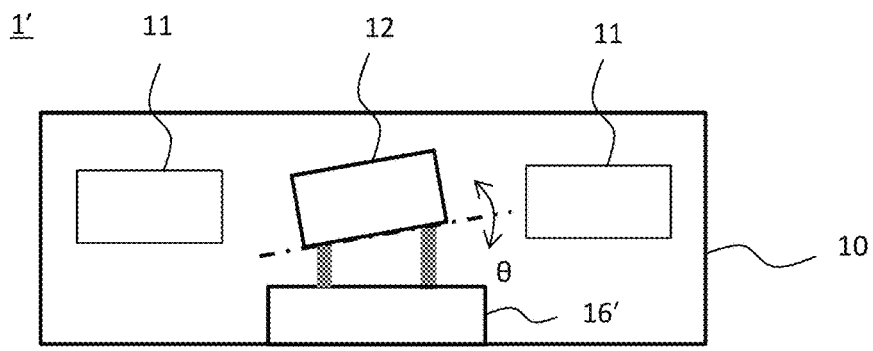

FIGS. 9A and 9B are block diagrams illustrating a second configuration example of the distance measurement device according to the present invention. A distance measurement device (TOF device) 1' includes the same components as those in the first embodiment (FIG. 1), but has the posture adjustment function with a different configuration. FIG. 9A illustrates the entire configuration of the device, and FIG. 9B is a block diagram of the device as seen from the front.

A posture adjustment mechanism 16' in the second embodiment is installed inside the housing 10, and holds only the light receiving unit 12 to adjust the posture of the light receiving unit 12 with respect to the housing 10. Accordingly, when the directions of the pixel array of the two-dimensional sensor 12a of the light receiving unit 12 and the directions of the ridges of the object 3 to be measured are set to obliquely intersect each other, similar to the first embodiment, the resolutions in the vertical and horizontal directions can be improved at the same time. The posture adjustment operation is the same as that in the first embodiment, and a description thereof will be omitted.

According to the configuration of the second embodiment, not only the same effect as that of the first embodiment is obtained, but also a movable portion is only the light receiving unit 12, and thus there is merit such as being able to further reduce the entire size of the device than the configuration of the first embodiment.

What is claimed is:

1. A distance measurement method for measuring a distance to an object based on a transmission time of light, the method comprising:
    receiving light reflected by the object with a two-dimensional sensor, in which a plurality of pixels are two-dimensionally arrayed, to obtain two-dimensional distance data from received light data in each of the pixels; and
    inclining a direction of a pixel array of the two-dimensional sensor by a predetermined angle θ with respect to a direction of a ridge of the object to receive the light,
    wherein when a length of the ridge of the object projected on the two-dimensional sensor is W, and a pixel interval of the two-dimensional sensor in a direction orthogonal to the ridge of the object is V, the predetermined angle θ is set to satisfy $(W/V)\sin\theta \geq 2$.

2. The distance measurement method according to claim 1, wherein luminance data of each of the pixels for the object projected on the two-dimensional sensor is used to detect the direction of the ridge of the object.

* * * * *